United States Patent [19]

Herwig et al.

[11] 3,853,819

[45] Dec. 10, 1974

[54] FLAME RESISTANT THERMOPLASTIC POLYESTERS

[75] Inventors: Walter Herwig, Neuenhain/Taunus; Hans-Jerg Kleiner, Bad Soden, both of Germany

[73] Assignee: Farbweker Hoechst Aktiengesellschaft, Frankfurt am Main, Germany

[22] Filed: July 19, 1973

[21] Appl. No.: 380,746

[30] Foreign Application Priority Data
July 22, 1972  Germany............................ 2236038
July 22, 1972  Germany............................ 2236039

[52] U.S. Cl.......................... 260/75 P, 260/DIG. 24
[51] Int. Cl.......................................... C08g 17/133

[58] Field of Search.................................... 260/75 P

[56] References Cited
UNITED STATES PATENTS
3,157,694    11/1964    Harwood......................... 260/502.4

FOREIGN PATENTS OR APPLICATIONS
387,245    5/1963    Japan

Primary Examiner—Melvin Goldstein
Attorney, Agent, or Firm—Curtis, Morris & Safford

[57] ABSTRACT

Flame resistant polycondensation products from aromatic or aliphatic dicarboxylic acids, diols and diphosphinic acid structural units suitable for making shaped articles by molding, injection molding or extrusion.

3 Claims, No Drawings

FLAME RESISTANT THERMOPLASTIC POLYESTERS

The present invention relates to thermoplastic polyesters which are rendered flame resistant by incorporation into the macromolecule of specific phosphorus organic structural units.

It has been proposed to render saturated linear polyesters flame resistant for example by adding red phosphorus, organic phosphorus compounds or halogenated aromatic compounds. These additives have certain drawbacks. They may detrimentally affect the tenacity of the polyester. Moreover, under the manufacturing and processing conditions required for saturated polyesters they have often too low a stability, are not sufficiently inert chemically or their vapor pressure is so high that they vaporize under reduced vapor pressure with thermal stress of the polyester. Processes have also been described in which phosphoric acid semi-esters of pentaerythritol are incorporated by condensation into the polyester. The products obtained by these processes likewise have disadvantagous properties such as low hydrolytic stability and tendency to uncontrollable cross-linking reactions in injection molding.

The present invention provides a polycondensation product consisting of a. 55 to 65 percent by weight of structural units of the formula

optionally in admixture with up to 5 percent by weight of other structural units deriving from aromatic or aliphatic dicarboxylic acid, b. 20 to 33 percent by weight of diol structural units of the formula $$-O-R-O-$$

in which R represents a saturated alkylene having 2 or 4 carbon atoms, optionally in admixture with up to 5 percent by weight of other structural units deriving from diols, and c. 3 to 20 percent by weight, preferably 5 to 15 percent by weight of structural units of the formula

in which $R_1$ is a saturated open chain possibly branched or cyclic alkylene having of from 1 to 15 carbon atoms, phenylene, biphenylene, or phenylalkylene having up to 6 carbon atoms in the alkylene group, $R_2$ and $R_3$ are identical or different alkyl radicals or cycloalkyl radicals having up to 6 carbon atoms, phenyl, or benzyl, which polycondensation product is very hard to inflame.

The phosphorus-organic structural units are incoporated into the polycondensation product by reaction with di-phosphinic acids and or monomeric or oligomeric bifunctional diphosphinic acid esters. Diphosphinic acids are known compounds which have been disclosed, for example, in U.S. Pat. Nos. 3,403,176 and 3,157,694. Monomeric or oligomeric bifunctional diphosphinic acid esters and processes for preparing them are described in application Ser. No. 380,743. (German application P 22 36 036.7) filed concurrently herewith.

Such monomeric or oligomeric bifunctional diphosphinic acid esters have the formula

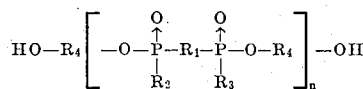

in which $R_1$, $R_2$, and $R_3$ have the above meanings and $R_4$ is a saturated, open chain, optionally branched or cyclic alkylene having 2 to 15 carbon atoms and n is a whole number in the range of from 1 to 30.

Especially suitable are compounds of the formulae

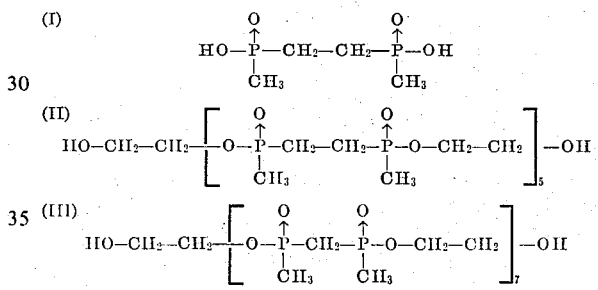

Besides structural units deriving from terephthalic acid the polycondensation product may contain up to 5 % by weight of structural units deriving from other aliphatic or aromatic dicarboxylic acids such as isophthalic acid, diphenyl-4,4'-dicarboxylic acid, naphthalene-2,6-dicarboxylic acid, or adipic acid.

Besides structural units deriving from ethylene glycol or 1,4-butane-diol the polycondensation product may contain up to 5 percent by weight of structural units deriving from other diols such as 1,3-propane-diol, 2,2-dimethyl-1,3-propane-diol, or 1,4-dihydroxy-methyl-cyclohexane.

The polyesters of the invention are manufactured by known processes. First terephthalic acid or an ester-forming derivative thereof is reacted with about double the stoichiometric amount of the diol. The bifunctional diphosphinic acids or the esters thereof are preferably added prior to the beginning of polycondensation and the condensation in the melt is effected in usual manner in the presence of known catalysts. It should be noted that bifunctional diphosphinic acids may be slightly volatile under high vacuum and at elevated temperature so that a small loss may occur until they are completely incorporated by chemical reaction. In general, this problem can be avoided by using appropriate esters.

In the final polyester the phosphorus-organic structural units are statistically distributed in the macromolecule.

The polyesters of the invention deriving from ethylene glycol are surprisingly transparent and have a reduced specific viscosity of from 0.7 to 2.0 dl/g, preferably of from 1.0 to 1.7 dl/g, measured with a 1 percent solution in a 60 : 40 mixture of phenol/tetrachloroethane at 25°C.

The polyesters deriving from 1,4-butane-diol have a reduced specific viscosity of from 0.7 to 1.8 dl/g, preferably 0.9 to 1.6 dl/g.

To produce polyesters having very high reduced specific viscosities an after-condensation in the solid phase is performed after the condensation in the melt.

The burning properties of the polyester of the invention were tested on 12.7 × 1.27 cm bars according to ASTM D 635-68.

Inorganic fibers materials such as glass fibers, fibers of quarz, asbestos and carbon may be added to the polycondensation products in usual amounts if the transparency of the product is of minor importance.

The polyester may further contain known additives such as stabilizers, lubricants, dyestuffs, and fillers as well as compounds with antistatic effect.

The flame resistant polyesters according to the invention can be used for the manufacture of transparent crystalline shaped articles, for example by molding, injection molding or extrusion. They are suitable for making sheetings and fibers, as well as casings, structional parts for electrical apparatus, mechanic transmission elements in automatic machines, hollow bodies, building units in large scale computers and sensitive electronic devices.

The following examples illustrate the invention.

EXAMPLE 1:

In an apparatus with stirrer 1,016 g of diglycol terephthalate were mixed under nitrogen with 76.8 g of ethylene-1,2-di(methylphosphinic acid) and 0.24 g of germanium phosphite and the mixture was slowly heated under a current of nitrogen. At 180°C the pressure was reduced to 200 torr, during the course of 1 hour the temperature was raised to 270°C and the pressure continuously reduced to 100 torr. Condensation was continued for 4 hours at 270°C, of which 3 hours under 1 torr. The cold block of condensation product was comminuted. It had a reduced specific viscosity of 0.85. By condensation in the solid phase in a rotary vessel at 230°C under 0. – 0.2 torr the reduced specific viscosity of the granules was increased to 1.26.

The phosphorus content of the polyester was found to be 2.4, 2.4; as compared to the theory of 2.96.

From part of the granules plates were molded at 240°C and from the plates test bars of the dimensions 12.7 × 1.27 cm were cut. The burning test carried out according to ASTM designation D 635-68 classified the product as non-flammable.

From another part of the material plates were molded on an injection molding machine at a cylinder temperature of 280°/290°/280°C and a temperature of the mold of 20°C. The plates obtained were transparent and colorless.

EXAMPLE 2

Instead of the phosphorus compound specified in Example 1 80.5 g of the compound of the aforesaid formula III was used. The experiment was carried out as described in Example 1.

The product condensed in the melt had a reduced specific viscosity of 0.92 and the product after-condensed in the solid phase had a reduced specific viscosity of 1.18.

The analytically found phosphorus content corresponded to the content theoretically to be expected.

The burning test classified the product as non-flammable.

EXAMPLE 3

The experiment was carried out as described in Example 1 with the exception that 65 g of methyl-di(methylphosphinic acid) were used instead of the phosphorus compound used in that example. The product condensed in the melt had a reduced specific viscosity of 0.79, the product after condensed in the solid state had one of 1.21.

The burning test classified the product as non-flammable.

EXAMPLE 4

In an apparatus with stirrer 388 g of terephthalic acid dimethyl ester were mixed under nitrogen with 400 g of 1,4-butane-diol and the mixture was heated at 180°C. After the addition of 2 ml of a 1.055 molar solution of titanium tetraisopropyl ester in benzene the temperature was raised to 200°C during the course of one hour, the mixture was maintained at that temperature for about 2 hours until the methanol distillation was terminated. The pressure was then reduced to 200 torr, the temperature increased to 275° and the pressure was continuously reduced to 1 torr. After distilling off part of the butane-diol the vacuum was compensated and 50 g of the compound of formula I) specified above were added. The vacuum was again produced and the condensation continued for another hour, the total condensation period under reduced pressure being 4 hours. The purely white block of cold condensation product was granulated. The polycondensation product had a reduced specific viscosity of 0.77. By condensation in the solid phase in a rotary vessel at 190°C and 0.2 torr the reduced specific viscosity of the granules were increased to 1.0.

On an injection molding machine the granules were molded into plates at a cylinder temperature of 260°/270°/260°C and a temperature of the mold of 20°C. The plates were purely white. The burning test, carried out under the specifications of ASTM D 635-68, classified the material as non-flammable.

EXAMPLE 5

The experiment was carried out as described in Example 4 with the exception that the compound of formula II given above was used. The product condensed in the melt had a reduced specific viscosity of 0.92, the value of the product condensed in the solid state was 1.27. At 220°C the product was molded into plates from which test bars of the dimension 12.7 × 1.27 were cut. In the burning test the product could be classified as non-flammable.

What is claimed is:

1. A polycondensation product, consisting essentially of the reaction product of
   a. 55 to 65 percent by weight of terephthalic acid or the ester forming derivatives thereof, optionally in admixture with up to 5 percent by weight of other aliphatic or aromatic dicarboxylic acids, b. 20 to 33 percent by weight of ethylene glycol or 1,4-butane-diol optionally in admixture with up to 5 percent by weight of other diols, and c. 3 to 20 percent by weight of bifunctional diphosphinic acids of the formula

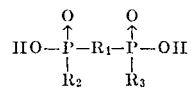

and/or monomeric or oligomeric bifunctional diphosphinic acid esters of the formula

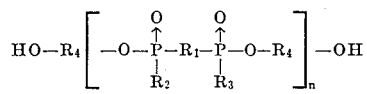

in which $R_1$ is saturated straight chain, branched chain, or cyclic alkylene having of from 1 to 15 carbon atoms, phenylene, biphenylene, or phenylalkylene having up to 6 carbon atoms in the alkyl group, $R_2$ and $R_3$ are identical or different alkyl or cycloalkyl groups having up to 6 carbon atoms, phenyl, or benzyl, $R_4$ represents a saturated straight chain, branched chain, or cyclic alkylene having of from 2 to 15 carbon atoms and n is a whole number of from 1 to 30.

2. Polycondensation product as claimed in claim 1, having a reduced specific viscosity of from 0.7 to 2.0 dl/g, measured in a 1 percent solution in a 60 : 40 mixture of phenol/tetrachloroethane at 25°C.

3. Flame resistant shaped articles produced from a polycondensation product as claimed in claim 1 by molding, injection molding or extrusion.

* * * * *